2 Sheets—Sheet 1.

B. T. TRIMMER.

Grain Separator.

No. 1,545.

Reissued Sept. 29, 1863.

WITNESSES

A. Parsons

W. A. Loder.

INVENTOR

B. T. Trimmer.

2 Sheets—Sheet 2.

B. T. TRIMMER.

Grain Separator.

No. 1,545.

Reissued Sept. 29, 1863.

WITNESSES

Geo. Gross

W. H. Goder

INVENTOR

B. T. Trimmer

UNITED STATES PATENT OFFICE.

B. T. TRIMMER, OF ROCHESTER, NEW YORK.

IMPROVEMENT IN GRAIN-SEPARATORS.

Specification forming part of Letters Patent No. 21,036, dated July 27, 1858; Reissue No. 1,545, dated September 29, 1863.

*To all whom it may concern:*

Be it known that I, BENJAMIN T. TRIMMER, of Rochester, in the county of Monroe and State of New York, did invent certain new and useful Improvements in Machines for Cleaning Grain, for which Letters Patent of the United States were granted me on the 27th day of July, 1858; and I do hereby declare that the following is a full and exact description thereof, reference being had to the accompanying drawings, making part of this specification.

Figure 1:
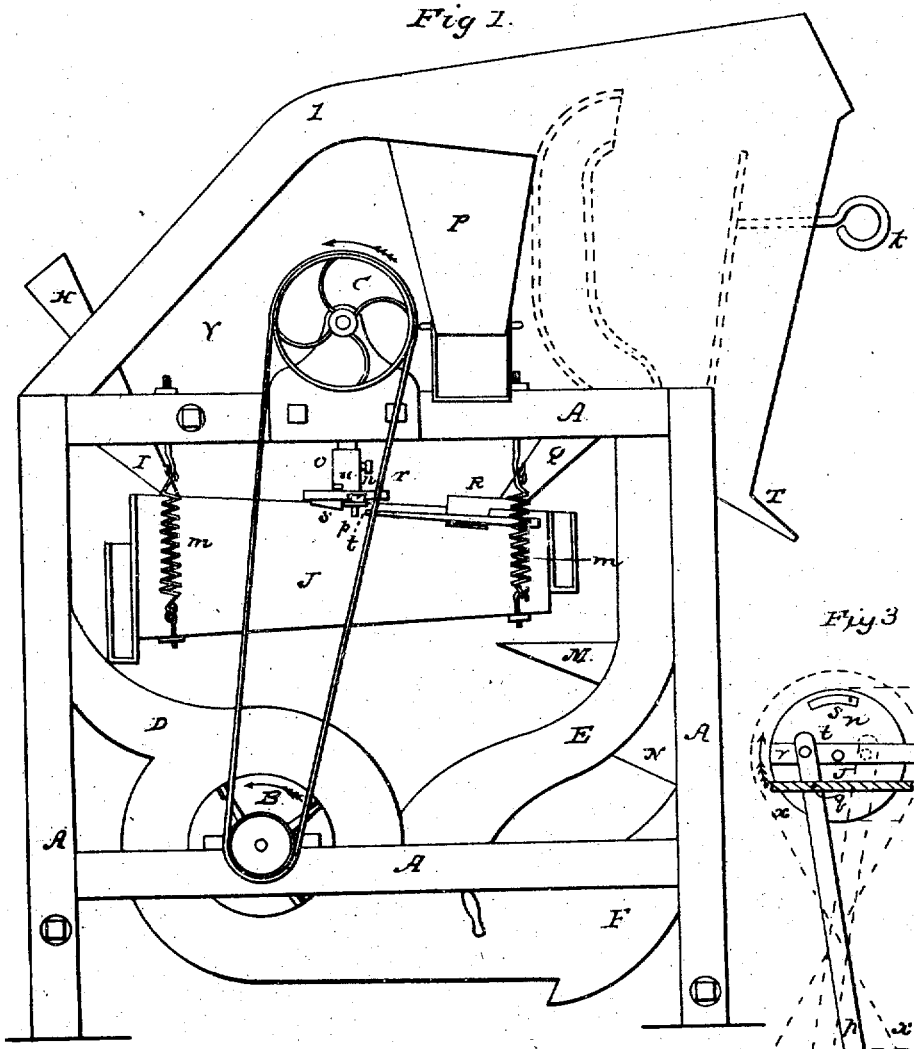
Figure 3:
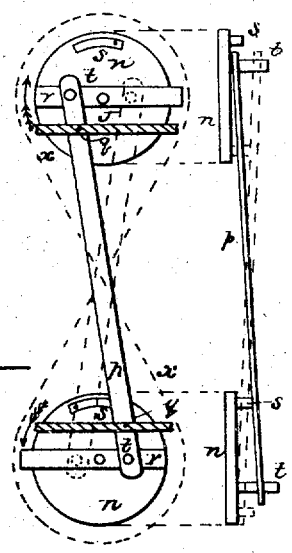
Figure 2:
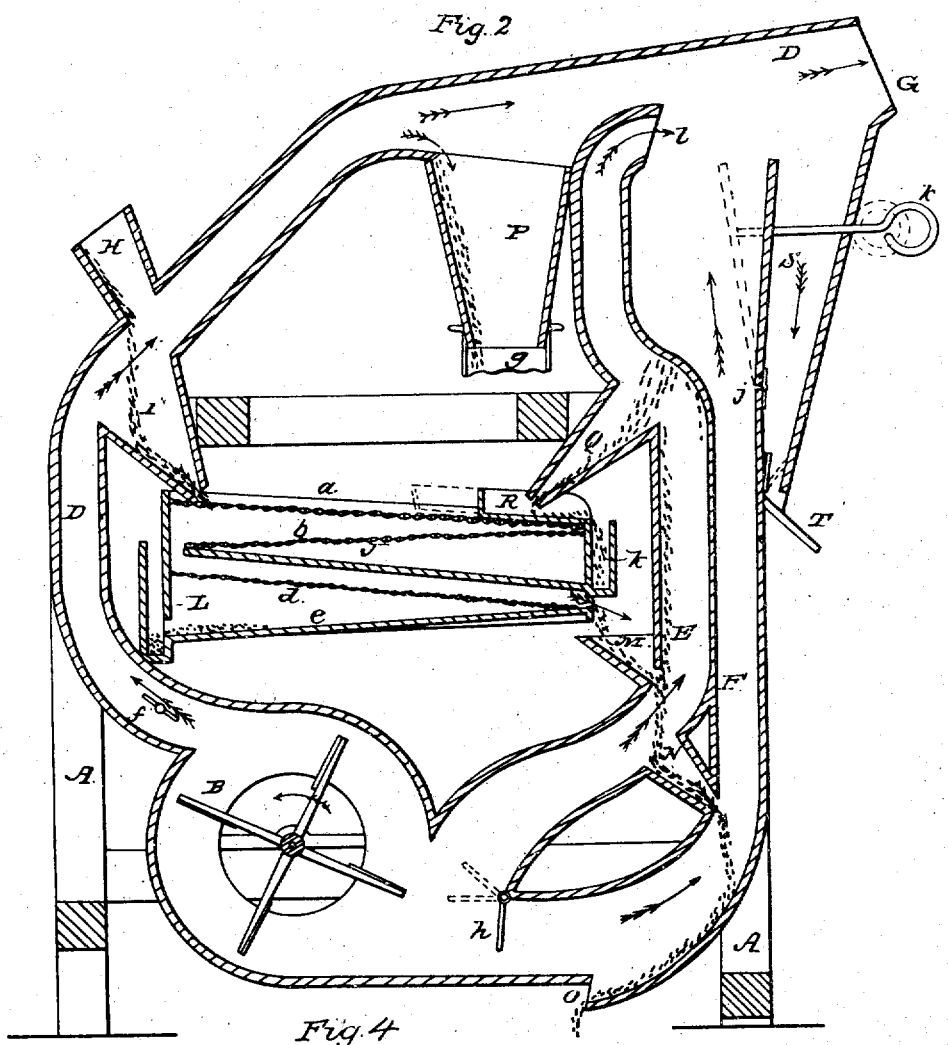
Figure 4:
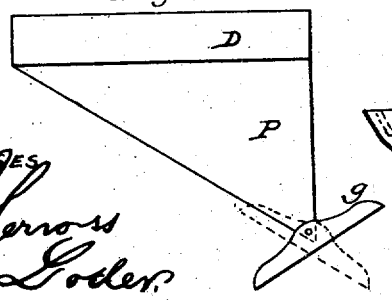
Figure 5:
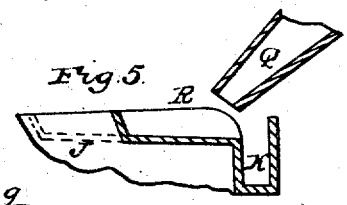

Figure 1 is a side elevation of my improved machine; Fig. 2, a longitudinal vertical section of the same; Fig. 3, views of the device for communicating motion to the screen; Figs. 4 and 5, views of parts detached.

Like letters of reference indicate corresponding parts in all the figures.

A suitable frame, A, is provided, in which is mounted a blast or suction fan, B, driven by a band from a pulley, C, or in any equivalent manner. The blast or draft produced by the fan is conducted through three tubes, D, E, and F, which unite in one discharge at the opening G. The tubes are arranged substantially as represented, D being provided with a valve, *f*, by which the intensity of the current of air is regulated, and a similar valve, *h*, being provided at the lower junction of E and F, by which the intensity of the current is regulated in either, or by which, being set in an angular position, it is deflected into and consequently increased in either.

The grain is introduced to the machine through a hopper or spout, H, falling through the first blast or draft, D, into a spout, I, whence it is discharged and caught by some suitable device, that represented in the drawings being a coarse screen, *a*, of a shaker, J. This screen is sufficiently coarse to allow the perfect grain to pass through it, but retains any coarse matter—such as sticks, oats, &c.—which are carried down by its inclination into an inclined spout, K, by which they are discharged. A finer reverse-screen, *b*, beneath returns the grain, but passes chess and other small seeds, which drop on a board, *c*, inclining with screen *a*, and which also discharges into spout K. The screen *b* discharges the perfect grain on another fine screen, *d*, also inclining with *a*, and beneath this is another reverse-board, *e*, which discharges the fine refuse it receives into a discharge-spout, L. The grain from the screen *d* now falls into a spout, M, and thence through the second blast or draft, E, into a spout, N, and thence through the third blast or draft F, down which it passes, and finally escapes at the final discharge, O, thoroughly cleansed and purified. A greater number of screens may be used, if desired, arranged in the same way.

At a suitable position in the upper portion of the tube D is made a receptacle or pocket, P, of considerable extent and capacity, opening from the under side of the tube, as clearly represented in Figs. 1, 2, and 4, which latter is a view at right angles to the former. The position of this receptacle is such that it is over the screen *a*, already described, and it is provided at its lower end with a centrally-pivoted double spout, *g*, which, when inclined in one direction (as in dotted lines) throws the substance collecting in the receptacle onto the screen, but when inclined in the opposite direction (as in black lines) throws it to one side, away from the screen, so as to be separately discharged.

My machine is intended for cleaning large quantities of grain and with great rapidity. In cleaning at the rate of three or four hundred bushels per hour, it is necessary that the draft or blast through D should be very intense, otherwise the grain falling through it in a heavy and compact stream will not be well cleansed; but while the current of air is thus intensified, the weight of the grain itself is not increased, so that there is a greater tendency of the grain to be carried upward with the current than in usual hand-machines, where the blast is proportioned to the amount of grain falling through it—in other words, the blast acts more strongly upon the grain than in small machines. As the grain is carried upward, the enlargement produced by the receptacle P modifies or weakens the blast, and the grain falls into it, while the lighter impurities pass onward and are discharged. Oats that may be mixed with the wheat also fall into the receptacle and on the screens, where they are not only separated from the wheat, but also from all foul seeds, and deposited by themselves in the spout K, perfectly cleaned. I am aware that pockets used in connection with an upward or vertical blast-tube have before been used for catching blighted grains and foreign seeds that pass upward with the blast, but since, in such cases, sound grains do not collect there, it is not desirable and would be injurious to pass the contents through screens that receive the sound grain already separated. In my case it is different, since, to save the grain that collects in the receptacle, it is necessary to subject it to further action by screening, and this is done automatically and without removing it by hand. This advantage is so apparent as not to require further explanation. By the means described I save all that is valuable and cleanse the grain perfectly.

The passage of the grain from the spout H to I is such as to cross the blast nearly at right angles, so as to receive its greatest benefit, and the position of the spouts is such—the lower one flaring inward—that the grain is caught and discharged without any escape down the tube D into the fan-case. This proper discharge is also assisted by the blast, which has a tendency to blow the grain forward into the spout I.

The strong blast through E will also elevate some portion of the grain that enters there. By a sudden curve in the direction of the tube at *i* a considerable portion of this is deflected from its course, falling into a return-spout, Q. Here provision is made for passing it again over the screens or rejecting it with the refuse, if its quality is worthless. This consists in a sliding deflector, R, which sits upon the top of the shaking-box J, and is constructed to slide upon guides or ways attached to its side. In the position represented in Fig. 2 it receives the grain returned by spout Q, and, being inclined like the upper screen, deflects it into the side spout K. If moved back in the position indicated by dotted lines, the spout Q discharges directly upon the screens, and the imperfect grain is again submitted to the ordeal of screen and blast.

The separation of various kinds of grain—as oats, rye, &c., from wheat, and the removal of chess, cockle, and shrunken wheat—depends materially upon subjecting them to blasts of varied intensity, such as are obtained by the triple arrangement of tubes which I employ, and by which I obtain a most perfect separation. The process is not complete until the grain has been passed through the blast-tube F. Here the heaviest grain descends to the main outlet O, but as perfect separation of the lighter from the heavier grain is desirable, it is effected through this tube in connection with E. Its blast is regulated in part by valve *h*, but more fully by a jointed diaphragm, S, which separates tube F from the enlarged space of the blast-head, in which the three tubes terminate. It is hinged at *j*, and adjusted as required by the rod *k*. By moving it outward, it forms, with the recess at the deflection of E, a largely-expanded area, which modifies the blast, so as to allow the return of all but the lightest grain that may be drawn up it. It also receives that portion which the force of the current in E has carried up, so as to emerge at *l*. By so moving the diaphragm as to contract tube F to a narrow space at *l* the blast is strengthened, and the lighter grain from both E and F may be discharged above the diaphragm and descend through the throat T, where it is discharged in a separate place. The dust and slight impurities are all discharged at G, the main outlet of the blast-head. By turning valve *h* in the position shown in Fig. 2, nearly all the blast is driven up tube E, and with a force sufficient, if required, to carry a greater part of the grain up E, and this may be returned through the screening-box or shaker again and again, or blown over at *l* and returned through tube F, where it is subjected to a lighter blast. This concentrating the blast through E increases that of D, but this may be regulated, as found necessary, by the valve *f*. Increasing and diminishing the space between *l* and the diaphragm S also exerts an influence on the blast of D, for, as that space is contracted, the blast D is weakened by the expansion of the head, and will drop its heavier particles through T. The arrangement of the several blast-tubes, the movable diaphragm, and the valves is designed to give the operator perfect control over his machine, enabling him to increase or modify the force of the blast in either or all the tubes, while acting on the grain in its several passages through the blasts, thereby adapting it to the variations in the gravity of the grain, as well as to the cleaning and separating of different kinds of grain.

The shaker or screen-box J is operated with a vertical vibratory motion and horizontal sweeping motion at the same time. It is suspended by four coiled springs, *m*, one placed at each corner. Directly above it two disks or wheels, *n*, are hung at the ends of vertical shafts *o*. To the lower face of these disks a rod, P, is attached to pins, which form cranks. The pins are placed at opposite relative positions to the shafts of the wheels, so that when rotated in opposite directions the ends of the rod P are made to revolve also in opposite directions, giving a compound circular or gyratory movement, as represented by the dotted lines *x x* in Fig. 3, which is an inverted plan view of this arrangement. Bevel-gears, or other equivalent arrangements, are employed to drive these cranks in their opposite directions. The rod *p* is attached to the top of the screen-box J, causing it to pass through the same evolutions. Fig. 3 shows the screen-box as attached at *q*, and Fig. 1 represents the part in elevation. To vary this sweeping motion the crank-pins are attached to dovetailed slides *r*, by which the crank may be made longer or shorter. To give the vibrating motion, a wedge-shaped cam, *s*, is attached to the face of each crank-wheel so as to pass the rod *p* at each revolution. Play is given the rod on the two crank-pins *t*, Fig. 3, and the springs *m* hold it against the face of the wheels until it is raised by the point of the cams. As the cam passes the rod the springs throw it back to its former position. The cams are so placed on the wheels that one end of the rod is passed by one before the opposite end is reached by the other, thus increasing the vibrations produced upon the screens. These cams are raised and lowered at the thick end by means of a set-screw, *u*, to give greater or less motion, as required. The effect of this compound gyrating and vibratory motion upon the grain in passing the screens is very thorough, the motions being a close imitation of the natural operation of the human hands in screening. By means of this the horizontal motion of the screening-surface is varied so as to give the greatest range of motion to the edges or exterior parts, while the center is comparatively quiet. This tends to overcome the centrifugal tendency of the grain, whereby it is apt to clog all the borders of the screens and reduce their superficial area.

On some grains the use of the cams *s* may be dispensed with, as they do not require such vigorous shaking.

I do not claim, broadly, a receptacle or pocket in connection with an upward-blast tube for receiving the foul seed, as I am aware that such has before been known, but I am not aware that a receptacle or pocket opening from the bottom of such tube has ever before been used in combination with a screen or screens beneath for separating the sound grain that is drawn upward by the blast; therefore

What I claim as my invention, and desire to secure by Letters Patent, is—

1. The combination of the blast or draft tube D, pocket P, and screens *a b d*, or equivalents, arranged in such a manner that the grain that is carried into the pocket is discharged onto the screens to be separated with the main portion of grain fed directly thereon, substantially as herein described.

2. In combination with the blast or draft tube D, pocket P, and screens *a b d*, or equivalents, the pivoted double spout *g*, arranged in such a manner as to discharge the contents of the receptacle either upon or aside from the screens, to accommodate different kinds and conditions of grain, substantially as herein specified.

3. The arrangement of the triple blast or draft tubes D E F, connected with the fan-case and uniting in a common discharge-head, G, the tube D, being provided with the valve *f*, and the tubes E F, having a valve, *h*, at their junction, by which arrangement the current of air may be intensified or modified in either or all the tubes, substantially as herein set forth.

4. The adjustable diaphragm S, situated in the discharge-area at the outlet junction of the triple blast or draft tubes, in combination with said tubes D E F, by which means the current of air in either is modified, substantially as described.

5. The combination and arrangement of the blast-generator B, triple blast-tubes D, E, and F, and their valves *f h*, movable diaphragm S, with the screen-box J and return-spouts P and Q, operating conjointly for separating, screening, and returning the grain, and for increasing, diminishing, and modifying the blasts for the various purposes required, substantially in the manner set forth.

6. The adjustable deflector R, in combination with the screen-box J, for returning the lighter grain through the screens and resubjecting it to the blast, or discharging it as refuse, as described.

7. Giving the screens an unequal, reversible, gyratory motion, for the purpose of neutralizing the centrifugal force of the grain and retaining it in the center thereof, in combination with the vertical vibratory motion by means of the double reverse-acting cranks *n n*, arms *s*, and springs *m*, or their equivalents, arranged and operating substantially in the manner and for the purpose set forth.

In witness whereof I have hereunto set my hand this 19th day of May, 1863.

B. T. TRIMMER.

Witnesses:
CHAS. H. CHERRY,
R. F. OSGOOD.